Dec. 29, 1959  K. W. GROSS  2,919,176
PROCESS OF ENHANCING THE OPERATING EFFICIENCY
OF A MULTI-OVEN AMMONIA-SYNTHESIZING SYSTEM
Filed March 8, 1957
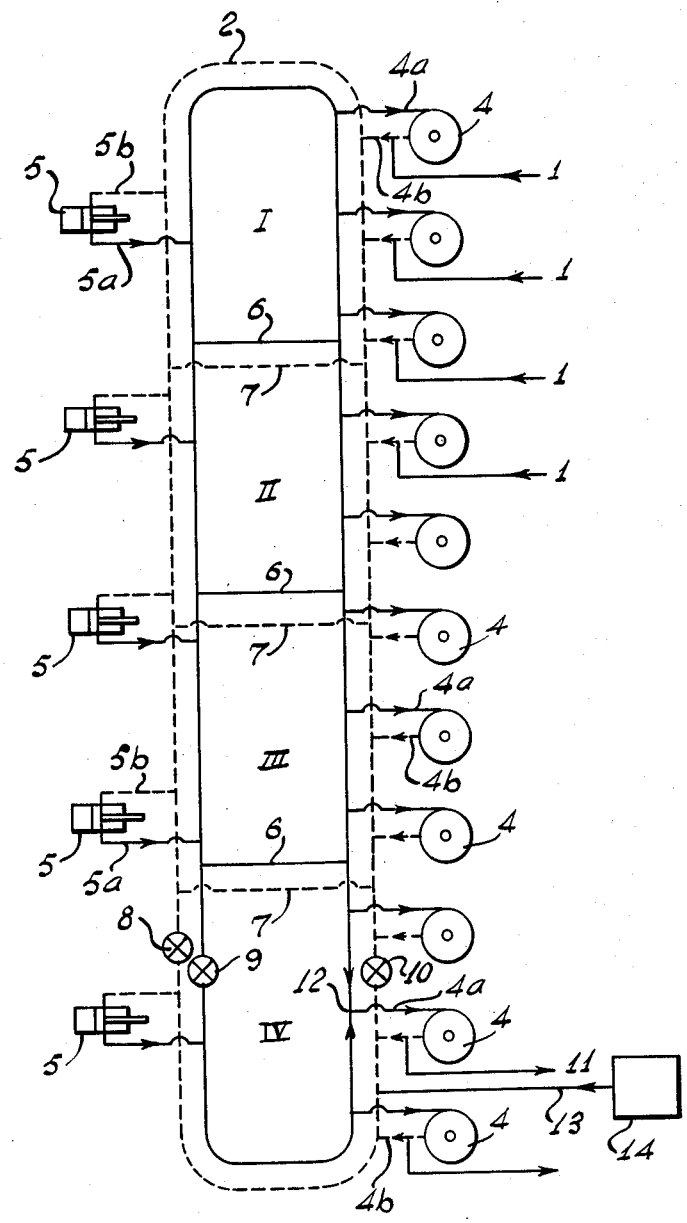
INVENTOR
KARL WALTER GROSS

United States Patent Office 2,919,176
Patented Dec. 29, 1959

2,919,176

PROCESS OF ENHANCING THE OPERATING EFFICIENCY OF A MULTI-OVEN AMMONIA-SYNTHESIZING SYSTEM

Karl Walter Gross, Leuna, Kreis Merseburg, Germany, assignor to VEB Leuna-Werke "Walter Ulbricht," Leuna, Germany Application March 8, 1957, Serial No. 644,912

Claims priority, application Germany July 13, 1956

6 Claims. (Cl. 23—198)

This invention relates to a process of enhancing the operating efficiency of a multi-oven ammonia-synthesizing plant.

It is known to effect production of synthetic ammonia under pressure in an ammonia-synthesizing plant operating on the circulating gas flow principle and including a number of individual synthesizing ovens connected in parallel with one another by feeding crude or fresh gas, namely a hydrogen-nitrogen mixture required for supplementing and replacing gas used in a system during the synthesis, continuously into only the first few ovens of the plant. Through corresponding disposition of the compressors or circulating pumps needed to compensate for the pressure losses in the system, if desired through the use of transverse or shunt lines subdividing the circulating system into a plurality of sections, it is possible to attain in the mixture a considerable concentration of inert gases, such as argon and methane, which do not take part in the synthesizing reaction. The concentration of these inert gases increases gradually from a minimum value in the first ovens at the beginning or inlet part of the system up to a maximum value in the last ovens at the end or outlet part of the system, whereby a reduction in the losses of hydrogen and nitrogen generally incurred during the necessary expansion or pressure drop occurring at the end of the synthesis is brought about. The same result, i.e., an increase of the inert gas concentration, occurs also in a plant employing a plurality of ovens connected in series with one another and operating on the straight flow principle, i.e., without circulating flow.

These known procedures, however, suffer from the considerable disadvantage that the unavoidable fluctuations of the composition of the gas mixture which are encountered during the synthesis of large quantities of ammonia and which have no noticeable effect on the operating efficiency of the first ovens, appear to an increasing extent in the last ovens of the system and have a marked effect on the operational efficiency of the plant. The strong fluctuations in the composition of the mixture gas in the last ovens are found to have an especially great adverse effect when an auxiliary system for recovering the inert gases is associated with the ammonia-recovery system. The operation and proper functioning of the auxiliary system is rendered particularly difficult by such fluctuations.

It is, therefore, an important object of the present invention to provide a process of increasing the operational efficiency of multi-oven plants for synthesizing ammonia, which process is simple and straightforward to practice and eliminates the aforesaid drawbacks and disadvantages inherent in the operation of known ammonia-synthesizing plants.

Another object of the invention is the provision of means enabling the aforesaid process to be carried out in a highly efficacious manner, regardless of the type of synthesizing plant employed, without necessitating the use of complex auxiliary mechanisms.

Still another object of the present invention is the provision of means by which the composition of the gas mixture to be synthesized into ammonia is supplementarily regulated at or near the end portion of the oven system to ensure proper proportioning of the hydrogen and nitrogen components of the mixture.

A further and related object of the present invention is to effect the above referred to supplementary regulation with the aid of an ammonia catalyst employed at a predetermined temperature to purify any hydrogen or nitrogen to be added to the synthesis system.

More particularly, an enhancement of the oven efficiency, according to the invention, is attained by providing for the supplementary regulation of the gas mixture, through the addition of either hydrogen or nitrogen, in the last part of the oven system, i.e., at those ovens in which the proportion of inert gases in the total gas mixture may rise up to about 30%. In this manner, the yield of ammonia in the last circulating part of the system rises considerably, while the expanded gas extracted from this part of the system has a much more uniform composition, whereby a constant and uniform operation of an associated fractionating or separating system is rendered possible.

The hydrogen or nitrogen required for the supplementary regulation of the gas mixture is preferably cleaned or purified prior to its entrance into the system by means of an ammonia catalyst at a temperature of about 180° to 250° C.

The foregoing and other objects and advantages of the present invention will become more clear from the following description taken in conjunction with the accompanying drawing which illustrates schematically and diagrammatically a multi-oven, multi-section, circulating flow-type ammonia-synthesizing system the efficiency of operation of which is increased by the process of the present invention.

Referring now more particularly to the drawing, it will be seen that the ammonia-synthesizing system includes a pair of large continuous ring conduits 2 and 3, of which the conduit 2 (shown in broken lines) is the suction conduit while the conduit 3 (shown in solid lines) is the pressure conduit. Arranged at one side of the system 2—3 is a plurality of ovens 4, each of which is provided with a duct 4a connected to the pressure conduit 3 and with a duct 4b connected to the suction conduit 2. The ovens 4 thus are connected in parallel with one another.

The ducts 4b of the first four ovens 4 communicate with pipes 1 through which the fresh gas or source gas mixture, consisting mainly of hydrogen ($H_2$) and nitrogen ($N_2$) to be synthesized into ammonia ($NH_3$), is introduced into the system. It is advantageous that the entry of the fresh gas mixture be effected only at the beginning of the system and preferably only over approximately one third thereof.

Arranged on the side of the system 2—3 opposite the oven side are circulating pumps 5 which communicate through ducts 5a and 5b with the pressure conduit 3 and the suction conduit 2, respectively, the pumps thus also being connected in parallel with one another. Connected across the conduits 2 and 3 at a plurality of locations spaced longitudinally thereof are shunt suction lines 7 and shunt pressure lines 6 which subdivide the large circulating ring system into a plurality of smaller ring systems or sections I, II, III and IV with each of which some of the ovens of the entire system are associated. Where, as illustrated in the drawing, three sets of shunt lines are employed, forming the aforesaid four sections, the required fresh gas mixture for the entire system is introduced only through the pipes 1 of the first four ovens. As a result, the inert gas concentration, i.e., the proportion of argon (Ar) and methane ($CH_4$) in the mixture, in the section I will increase only negligibly, if at all. However, since the ammonia formed or synthesized in the next three ovens 4 is replaced by the gas which has been passed through the first four ovens, a process which is repeated in the succeeding ovens, there occurs a noticeable incease of the inert gas concentration from the first ovens on in the direction of the last ovens.

The conduits 2 and 3 are provided at one part thereof forming the pump side of the section IV of the system with valves 8 and 9, respectively, while a valve 10 is incorporated in the conduit 2 at the part thereof forming the oven side of the section IV. By means of these valves, which preferably are of the shut-off or gate type, the last section IV, i.e., the end of the circulating system, may be connected only to the pressure conduit of the preceding section III and disconnected from the suction conduit thereof. When this has been done, it is possible to further increase the inert gas concentration in the section IV. This inert gas increase is effected by using the last circulating pump 5, which now too is connected only to the pressure conduit of the preceding section III, to recirculate the gas mixture through the last two ovens 4 a number of times. It is to be noted that while this condition obtains, the suction and pressure conduits 2 and 3 at the sections I, II and III are all open and the circulating gas mixture can flow freely into and out of the shunt lines 6 and 7 depending on the operating load or the possible disconnection of one or more ovens and/or pumps from the system.

Pipes 11 communicate with the ducts 4b of the last two ovens 4, while a pipe 13 communicates with the suction conduit 2 between the aforesaid last two ovens. The pipes 11 serve to conduct the expanded gases away from the system. The conduit 4a of the next to the last oven 4 communicates with the pressure conduit 3 at 12 which is the point at which two masses of gas come together to flow jointly into the said next to the last oven 4. One of these gas masses is that being circulated by the last pump 5 through the conduit 3 of the last ring section IV, while the other mass of gas is that arriving through the remainder of the conduit 3 from the preceding sections I, II and III, this latter gas mass corresponding in quantity to the conversion occurring in the last ovens, as well as to that amount of expanded gases leaving the system via the conduits 11. It will, of course, be understood that the pressure of the gas in the last section IV at the point 12, or alternatively the differential pressure at the last pump 5, is suitably predetermined in such a manner that the gas in the conduit 3 is always constrained to flow toward the next to the last oven 4. The pipe 13 is connected to a composition regulating device 14 which includes a source of hydrogen, a source of nitrogen, suitable means for effecting and controlling the flow thereof into the last two ovens 4, e.g. a pump and a flow regulator (not shown), and an ammonia catalyst consisting essentially of 95% iron (Fe), 4% aluminum oxide ($Al_2O_3$), 0.4% potassium oxide ($K_2O$) and 0.6% calcium oxide (CaO). The function of the ammonia catalyst in the device 14 is not to cause the formation of any ammonia but merely to purify the supplementary hydrogen or nitrogen to be added to the mixture in the system 2—3, and in particular to that part of the mixture in the section IV of the system. As indicated hereinabove, the purification is carried out at a temperature ranging between about 180° C. and 250° C.

Inasmuch as the ammonia catalyst employed for this purpose serves also to transform any carbon monoxide accompanying the hydrogen into methane as well as to transform any oxygen accompanying the nitrogen into water, it is preferable to carry out the purification of the hydrogen and nitrogen intended to be added individually and selectively to the gas in ring section IV in one and the same apparatus or device 14. From the foregoing, it will be understood that only hydrogen or nitrogen is ever added to the said gas at any one time, but never the two together, inasmuch as the said gas can only be deficient in one of these elements at a time. Even under conditions in which neither hydrogen nor nitrogen need be added to the circulating gas mixture, it is advantageous to add minimum quantities of hydrogen in order to ensure a continuous regeneration of the catalyst.

The process of the present invention will become more clear from the following examples.

*Example 1*

The crude gas mixture fed into the system 2—3 at the first four ovens 4 through the pipes 1 has an inert gas content of ($CH_4$+Ar)=0.5%, while the active components range between the following limits:

|  | Percent |
|---|---|
| $H_2$ | 75.5 to 74.5 |
| $N_2$ | 23.5 to 24.5 |

When in operation under predetermined conditions, a gas mixture circulating in the section IV and detectable and analyzable at 12 is found to have a rate of flow of 9,500 $Nm.^3$/hr. and to include 75.0% $H_2$, 19.7% $N_2$ and 5.3% ($CH_4$+Ar). Thus, the ratio of hydrogen to nitrogen is, instead of the desired 3:1, 3.8:1 which is undesirable since it leads to waste of valuable hydrogen gas and renders the ammonia synthesis uneconomical.

To rectify this situation, nitrogen purified in the above-described manner is fed through the pipe 13 into the suction conduit 2 at the section IV at a rate of flow of 500 $Nm^3$/hr. As a result, the mixture extracted by means of a suitable expansion or pressure reduction procedure from the system through the pipes 11 has an hourly flow rate of 1,660 $Nm.^3$ and a composition of 52.5% $H_2$, 17.5% $N_2$ and 30% ($CH_4$+Ar).

*Example 2*

The initial conditions and composition variations are the same as in Example 1.

If an analysis performed at the point 12 of the section IV shows that, for an identical quantity of gas, the composition is 70% $H_2$, 25% $N_2$ and 5% ($CH_4$+Ar), the proper conditions may be reestablished by feeding previously purified hydrogen at a rate of 500 $Nm.^3$/hr. through the pipe 13. The hourly quantity of gas expanded through the pipes 11 is then the same as in Example 1.

The advantages and increased efficiency resulting from implementation of the process according to the present invention may best be visualized from the following.

*Example 3*

In an ammonia-synthesizing plant operating at 200 atm., an analysis averaged out over a three months period showed the following composition percentages: 40.0% $H_2$, 21.6% $N_2$, 20.4% $CH_4$, 18.0% Ar. Over a period of a few hours, however, the nitrogen content was found to vary between about 15% and 25%. The ammonia yield from the last three ovens of this plant during the three months period was 8,180 tons.

The operation of this plant was then modified through the performance of a supplementary regulation of the nitrogen-hydrogen ratio according to the invention as described hereinabove, and over a subsequent three months period the following average composition was obtained: 44.1% $H_2$, 15.8% $N_2$, 21.1% $CH_4$, 19.0% Ar. The nitrogen content at this time was found to vary only between about 14% and 17%, while for the same three months the ammonia yield rose to 8,605 tons, corresponding to an increase in operating efficiency of about 5.2%.

It will, of course, be readily realized that similar results would be obtained if the synthesis were carried out in a linear plant (series-connected ovens) rather than in a circulating plant (parallel-connected ovens) as illustrated herein.

I have described preferred versions of the manner of implementing my invention, but it is understood that this disclosure is for the purpose of illustration only and that various omissions and changes in proportion, temperature and time, as well as substitution of equivalent substances for those referred to herein may be made without departing from the scope of the invention as set forth in the appended claims.

What I claim is:

1. The process of synthesizing ammonia in a closed elongated ring-type synthesizing system including a plurality of ovens connected to said system and in parallel with one another at respective locations spaced longitudinally of said system, comprising the steps of introducing a gas mixture containing hydrogen, nitrogen and inert gases as components into the inlet part of said system so that the concentration of said inert gases in said mixture is minimum in the first ovens, circulating said mixture through said system and said ovens, whereby ammonia is synthesized and the concentration of said inert gases increased at other ovens subsequent to said first ovens and whereby a stoichiometric deficiency develops in one of said gases selected from the group consisting of hydrogen and nitrogen, and introducing into the last ovens of said system a predetermined quantity of one gas selected from the group consisting of hydrogen and nitrogen, to thereby supplement the quantity of the deficient one of said hydrogen and nitrogen components of said mixture so as to regulate the hydrogen-nitrogen ratio thereof.

2. The process of claim 1, comprising the further step of passing said predetermined quantity of gas over an ammonia catalyst prior to introduction of said gas into said other ovens.

3. The process of claim 2, wherein said ammonia catalyst is composed of 95% Fe, 4% $Al_2O_3$, 0.4% $K_2O$ and 0.6% CaO.

4. The process of claim 1, comprising the further step of purifying said predetermined quantity of gas prior to introduction thereof into said ovens.

5. The process of claim 4, comprising the further step of employing a common device for said purifying of both said hydrogen and said nitrogen one of which is to constitute said gas to be introduced into said ovens.

6. The process of synthesizing ammonia in a linear synthesizing system including a plurality of ovens connected to said system and in series with one another at respective locations spaced longitudinally of said system, comprising the steps of introducing a gas mixture containing hydrogen, nitrogen and inert gases as components into some of said ovens at the inlet part of said system where the concentration of said inert gases in said mixture is minimum, pumping said mixture through said system and said ovens toward the outlet part of said system whereby ammonia is synthesized and the concentration of said inert gases increased at other ovens subsequent to said first-named ovens and whereby a stoichiometric deficiency develops in one of said gases selected from the group consisting of hydrogen and nitrogen, and introducing into the last ovens of said system having an increased inert gas concentration a predetermined quantity of one previously purified gas selected from the group consisting of hydrogen and nitrogen, to thereby supplement the quantity of the deficient one of said hydrogen and nitrogen components of said mixture so as to regulate the hydrogen-nitrogen ratio thereof.

References Cited in the file of this patent

UNITED STATES PATENTS

| 1,849,357 | Pyzel | Mar. 15, 1932 |
| 1,938,598 | Loud | Dec. 12, 1933 |
| 2,826,480 | Webster | Mar. 11, 1958 |

FOREIGN PATENTS

| 5,833 of 1911 | Great Britain | Mar. 11, 1911 |